(12) United States Patent
Shih et al.

(10) Patent No.: US 6,703,922 B2
(45) Date of Patent: Mar. 9, 2004

(54) METHOD FOR MONITORING EXPOSURE TIME OF WORKERS IN WORKPLACE

(75) Inventors: Tung-Sheng Shih, Taipei (TW); Peng-Yau Wang, Taipei (TW)

(73) Assignee: Institute of Occupational Safety & Health, Council of Labor Affairs, Shijn (TW)

(*) Notice: Subject to any disclaimer, the term of this patent is extended or adjusted under 35 U.S.C. 154(b) by 0 days.

(21) Appl. No.: 10/179,181

(22) Filed: Jun. 26, 2002

(65) Prior Publication Data

US 2004/0008115 A1 Jan. 15, 2004

(51) Int. Cl.$^7$ .................................................. G08B 1/00
(52) U.S. Cl. ........................ 340/309.15; 340/691.1; 340/693.1; 340/693.5; 340/693.6; 340/573.1; 340/632; 340/521; 340/825.36; 340/825.49; 250/388; 250/484.5
(58) Field of Search .................... 340/506, 539, 340/691, 573.1, 693, 825.36, 825.49, 693.5, 693.6; 250/336.1, 337, 472.1, 374, 388, 484.5; 73/23.2

(56) References Cited

U.S. PATENT DOCUMENTS 6,031,454 A * 2/2000 Lovejoy et al. ............. 340/539

OTHER PUBLICATIONS

Jenkins, P. L.; Phillips, T. J.; Mulberg, E.J.; Hui, S. P., entitled "Activity Patterns of Californians: Use of and Proximity to Indoor Pollutant Sources", Atoms. Environ. 1992, 26A, 2141–2148.

Leaderer, B. P.; Lioy, P. J.; Spengler, J. D., entitled "Assessing Exposures to Inhaled Complex Mixtures", Environ. Health Persp Suppl. 1993, 101, 167–177.

Schwab M.; Terblanche A. P. S.; Spengler J. D., entitled "Self–Reported Exertion Levels on Time/Activity Diaries: Application to Exposure Assessment", J. Expo. Ana. Env. Epid. 1991, 1, 339–356.

Teschke, K.; Marion, S. A.; Jin, A.; Fenske, R. A.; Netten C., entitled Strategies for Determining Occupational Exposures in Risk Assessments: A Review and a Proposal for Assessing Fungicide Exposures in the Lumber Industry, Am. Ind. Hyg. Assoc. J. 1994, 55, 443–449.

Moschandreas, D. J.; Relwani, S., entitled "The Shadow Sensor: An Electronic Activity Pattern Sensor", J. Expo. Ana. Env. Epid. 1991, 1, 357–367.

Waldman, J. M.; Bilder, S. M.; Freeman, N. C. G.; Friedman, M., entitled "A Portable Datalogger to Evaluate Recall–Based Time–Use Measures", J. Expo. Ana. Env. Epid. 1993, 3, 39–48.

* cited by examiner

Primary Examiner—Daryl Pope
(74) Attorney, Agent, or Firm—Bacon & Thomas, PLLC

(57) ABSTRACT

A method for monitoring exposure time of workers involves the use of a sensor, which is carried by the workers for monitoring continually in a real-time fashion in an environment such that the results are recorded by a recorder. The an add-on or built-in timer in the sensor or the recorder is used to monitor time, which is recorded in the recorder simultaneously, so as to obtain the real-time continuous exposure level of a hazardous material in the environment.

2 Claims, 1 Drawing Sheet

METHOD FOR MONITORING EXPOSURE TIME OF WORKERS IN WORKPLACE

DESCRIPTION OF THE PRIOR ART

An accurate assessment of workers' exposure to the hazardous elements in a workplace is an essential prelude to the task for preventing the occupational illness, protecting the health of workers, and providing a basis for developing and implementing the control measures to minimize the exposure risk. According to the research conducted for years by the U.S. Occupational Safety and Health Research Center, the eight-hour workday time-weighted average exposure levels of workers in a workplace were log-normally distributed, with the exposure variation being substantial large among a group of workers who were subjected to similar exposure. In view of the fact that the production process, the raw materials, and the production facilities of a production plant are seldom changed in a large scale time after time, the exposure variation of workers is mainly due to the workers' time activity pattern (TAP). However, the accurate TAP data of the workers are technically difficult to gather. In other words, the acquisition of accurate personal TAP data is a technical bottleneck.

As shown in the Reference Material Nos. 1–4, questionnaires, diaries, phone calls, and personal interviews are most widely used to gather the workers' TAP data. These widely-used tools are by no means reliable in view of the fact that the data so obtained by means of the questionnaires are often not credible due to workers' lack of recollection of events, workers' lack of intellectual ability to comprehend fully the questions, workers' misunderstanding of the questions, or workers' lack of candidness in answering the questions. In addition, such widely-used tools as described above can not be conveniently executed in the workplace without causing the work interruption on the part of the workers. Aside from the drawbacks described above, these widely-used tools for gathering information of TAP are not cost-effective at best. According to the Reference Material No. 2, a method involving the use of direct observation in conjunction with the real-time recording is the most reliable one for gathering the workers' personal TAP data; nevertheless it is not economically feasible, not to mention the human factors such as workers' lack of desire to cooperate, as well as workers' concern over intrusion of their privacy.

As mentioned in the Reference Material No. 5, a time event recorder (TER) was recently introduced to monitor the workers' personal TAP. The time event recorder works in such a manner that various operational activities in a workplace are first coded before the time event recorder is given to workers' who are required to enter manually each operational information into the time event recorder from the onset of the operation. The data are automatically compiled and processed by the TER with precision. As a result, the TER is particularly suitable for use in gathering information on a well-defined event, which takes place with regularity. However, the TER is also subject to error when it is used to gather information on an event which lasts for a short period of time. In light of manual entry of the data by workers, the use of the TER calls for a work interruption on the part of workers, thereby undermining the quality of the process of gathering the data.

As mentioned in the Reference Material No. 6, a ceiling spacing sensor is used to assess the exposure of workers to pollutants in a workplace by monitoring time activities of workers in various locations of the workplace. The sensor is used in conjunction with a transmitter and a receiver, which are help uprightly for measuring the distance between the transmitter and a ceiling. The sensor is portable and can be operated with ease, with the drawback being that the workers' exposure levels are not directly correlated to the height of ceilings of the workplace. In addition, it is conceivably tiresome for workers to hold the transmitter and the receiver in the upright position. Moreover, the exposure levels may vary greatly from one workplace to another, even if the ceiling heights of different workplaces vary slightly.

In addition to the methods described above, the video technology is also widely used to gather information on exposure, time, activity of workers who are not required to move from one place to another on the floor of a workplace. The video technology is limited in its application because of its limitation in monitoring range and its high cost of equipment, installation and labor. The video technology is not suitable for use in monitoring a variety of exposure sources.

SUMMARY OF THE INVENTION

The present invention relates generally to a method for monitoring the exposure time of workers in a workplace, and more particularly to a method for monitoring the exposure time of workers to the harmful chemical substances in the workplace.

The present invention is designed to overcome the deficiencies of the prior art methods described above.

It is the primary objective of the present invention to provide a method for monitoring the personal exposure time of workers in a workplace.

It is another objective of the present invention to provide a method for monitoring the exposure levels of workers at various time blocks.

The method of the present invention involves the use of a sensing device and a recorder to monitor continually the changing conditions of a workplace in a real-time manner, so as to determine the extent to which workers are exposed to a hazardous element existing in the workplace. The workers' exposure time is monitored continually by means of time clock or watch dog. If necessary, the exposure level of a specific time block can be determined by the method of the present invention.

DETAILED DESCRIPTION OF THE INVENTION

The method of the present invention involves the use of a sensing device, which is carried by a worker to monitor continually the hazardous material, such as hazardous gas or aerosol, in the real-time fashion in the environment in which the worker works. The data are then transmitted to a data recorder in a real-time mode. The monitoring time is determined by an add-on or built-in timer such that the time is simultaneously recorded in the recorder, so as to obtain the real-time continuous exposure level of a continuous time block.

Figure 1:
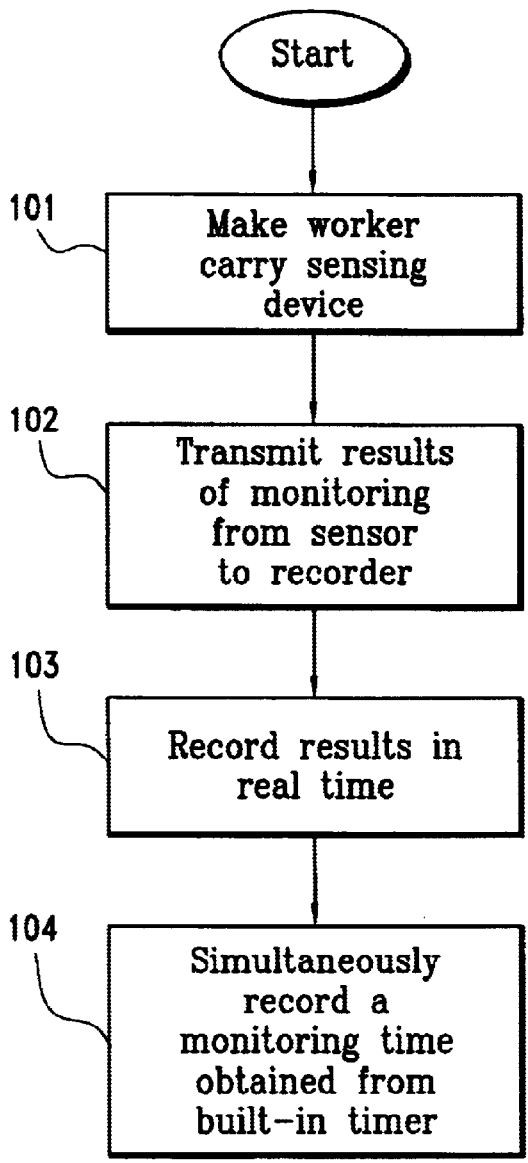
FIG. 1 is a flowchart of a method of monitoring the exposure levels of workers according to a preferred embodiment of the invention.
Figure 2:
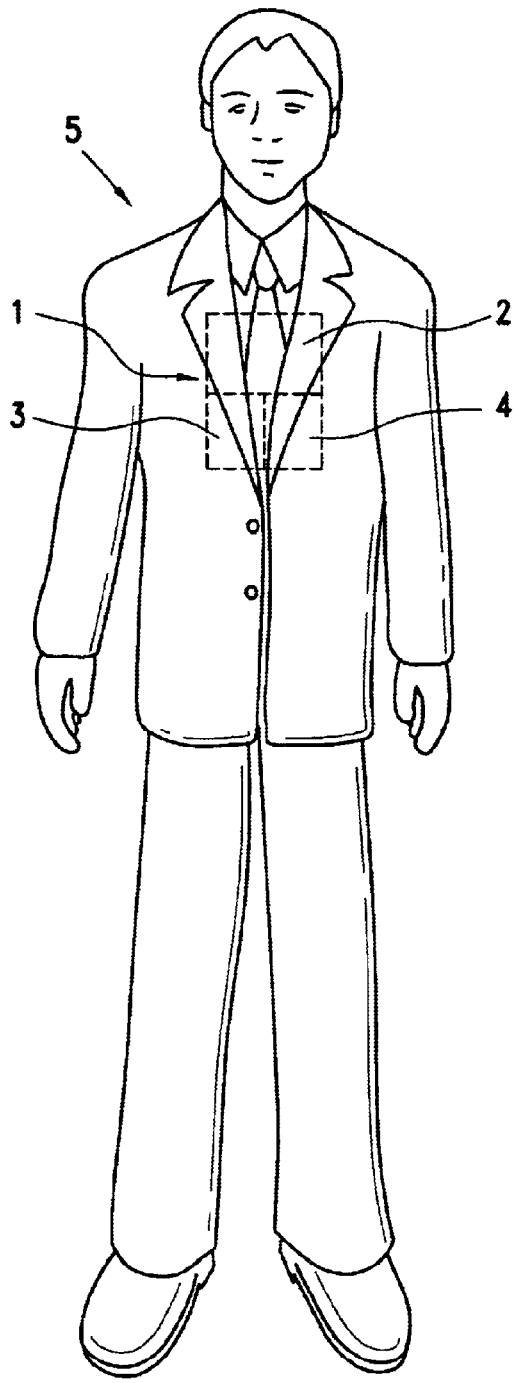
FIG. 2 shows a worker carrying a sensing device in accordance with the principles of the preferred embodiment of the invention.

As shown in FIGS. 1 and 2, step 101 of the preferred method involves having a worker 5 carry a sensing device 1 that includes a sensor 2, recorder 3, and timer 4. In step 102, the results of monitoring by the sensor 2 are transmitted from the sensor 2 to recorder 3. In step 103, the transmitted results are recorded by recorder 3 and in step 104, a monitoring time obtained from timer 4 is simultaneously recorded by recorder 3.

The sensing device referred to above can be any device or the like suitable for use in the industrial sanitation or industrial safety. In general, the sensing device is formed of a sensor and a sensing circuit. The sensor may be a conventional sensor, e.g., the chemical sensor, noise sensor, aerosol sensor. The chemical sensor is preferred.

The recorder referred to above is a conventional recorder and can be incorporated into the sensing circuit of the sensing device to form a data loger.

The sensing device and the recorder are preferably formed into a single monitor recorder, which is carried by the worker. The sensing device and the recorder may be set up separately such that the recorder is located at the far end, and that the detection signals are transmitted by the sensing device via the radio communication to the recorder in which the detection signals are registered. The single monitor recorder is suggested.

The timer referred to above may be a built-in timer of the sensing device or the recorder, such as clock, watch dog. The timer may be externally connected. The built-in timer is preferred. The sensing device built-in timer is better.

The method of the present invention will be more readily understood upon a thoughtful deliberation of the following detailed description of an embodiment of the present invention.

EMBODIMENT

Subject Workers

The exposure assessment of the present invention was carried out in the spinning department of a rayon viscose plant to study the exposure of a total of 27 workers to the hazardous chemicals of carbon disulfide and hydrogen sulfide.

Plant Layout and Operational Procedures

The plant has a total of 46 spinning machines. Basically, the workers in question were required to go from the waiting room to the work site four times each day in accordance with the work schedule as shown in Table 1. As the workers arrived at their respective work site, they were asked to open the hood of each of 3–4 spinning machines, so as to remove the rayon coils from the spinning machines. The workers were asked to remain in the waiting room for the remainder of the working day. According to the on-site preliminary inspection, the workers' exposures were arranged in three groups on the basis of the exposure levels. The exposure level was highest, $C_H$, at the time when the workers opened the hood of a spinning machine to remove therefrom the rayon coils. The intermediate exposure level, $C_M$, was registered at such time when the workers closed the hoods of the spinning machines and inspected the spinning machines, or at such time when the workers returned to the waiting room from the work sites. The exposure level was lowest, $C_L$, at the time when the workers remain in the waiting room which was independently furnished with fresh air. The exposure times of the exposure levels, $C_H$, $C_M$, $C_L$, were respectively denoted as $T_H$, $T_M$, $T_L$.

Estimation of $T_{ij}$

A comparison was made between the following types of $T_{ij}$ and the reference standard ($T_{ij}$ observation: records of 12 observers).

1. $T_{ij\ questionnaires}$: exposure time of various operations obtained from the questionnaires submitted by the worker "I" after eight-hour work shift.

2. $T_{ij\ plant\ work\ schedule}$: exposure time of various operations listed in the plant work schedule (Table 1).

3. $T_{ij\ ETAR}$: exposure time of various operations obtained from ETAR (electronic task activity recorder).

The ETAR used in the embodiment of the present invention was formed of a tin oxide chemical sensor (Figaro Engineering Inc. Model TGS-822, Osaka, Japan), a data logger (H08-007-02, Onset Corp., MA., U.S.A.), a data collection software (BoxCar® Pro Version 3.5 for windows Onset Corp., MA., U.S.A.). Upon completion of the experiment, the TAP data of the exposed workers were downloaded in the format of Microsoft Excel™ (Microsoft Corp., Seattle, Wash., U.S.A.) to a personal computer for display and analysis. Through an interface software, many important parameters, such as frequency of data acquisition, initial timing of the data recording, etc., could be easily predetermined. Each sensor used in the experiment was pre-calibrated by the standard gas generator in the laboratory.

Data Analysis

A paired-sample t test was used to compare the differences among the workers' TAP data obtained by the ETAR, the traditional questionnaires completed and submitted by the workers, the plant work schedules, and the reference standard (value of direct observation). The linear regression analysis was done to compare the agreement of the exposure time data from the various methods with respect to time blocks and eight-hour work shift.

Results

The Etar Performance

The stable pattern of the exposure activities of the workers in a workplace was confirmed by the ETAR. As soon as the workers left the waiting room for their work sites, the ETAR which was carried by each worker rose swiftly (<30 seconds) and stayed at that high level of response until the termination of operation. As soon as the workers returned to the waiting room from their work sites, the response of the ETAR dropped rapidly to the reference line. These phenomena serve to confirm the high performance of the ETAR being capable of reflecting rapidly and accurately the real-time fluctuation of the workers' exposures during the eight-hour work shift.

Explanation of Table 1

The plant data refer to the plant regulation, each activity time, e.g., first, second, third, fourth, fifth, and sixth activity time being respectively 8:15 to 9:15, 10:30 to 11:15, 12:15 to 13:15, 14:15 to 15:30, 16:15 to 17:30, and 18:30 to 19:15. The observation refers to the time at which the actual observation of the observer takes place, with one being the time at the machine and other being the addition of time for going from the waiting room to the machine. The real time refers to the time which was recorded in ETAR. The questionnaire refers to the time obtained by asking the workers.

TABLE 1 workers activity time by plant data, observation, real time, and questionnaires

| device code | time type | first time | 2nd time | 3rd time | fourth time | fifth time | 6th time |
|---|---|---|---|---|---|---|---|
| DT8 | plant data | 8:15~9:15 | 10:30~11:15 | 12:15~1:15 | 2:15~3:30 | 4:15~5:30 | 6:30~7:15 |
| | observation | 8:18~9:07 | 10:29~11:01 | 12:15~12:55 | 2:14~3:03 | 4:18~5:03 | 6:24~7:00 |
| | Observation (including from waiting room to machine) | None | 10:26~11:0 (+3) | 12:14~12:55 (+1) | 2:12~3:03 (+2) | 4:16~5:03 (+2) | 6:22~7:00 (+2) |
| | real time | 8:16:30~09:07:00 | 10:28:00~11:04:00 | 12:16:00~12:57:00 | 02:15:30~03:04:00 | 04:18:30~05:06:00 | 06:24:00~07:02:00 |
| | questionnaire | 8:30~9:30 | 10:00~10:30 | 11:30~12:00 | 2:00~2:30 | 4:00~4:30 | 6:00~6:30 |
| DT12 | plant data | 8:15~9:15 | 10:30~11:15 | 12:15~1:15 | 2:15~3:30 | 4:15~5:30 | 6:30~7:15 |
| | observation | 8:25~9:07 | 10:35~11:02 | 12:18~1:00 | 2:16~3:03 | 4:20~5:14 | 6:28~7:14 |
| | Observation (including from waiting room to machine) | this person stayed at other waiting room and was not observed to have left the waiting room | | | | | |
| | real time | 8:18:30~09:10:00 | 10:35:00~11:04:30 | 12:16:30~01:03:30 | 02:16:00~03:06:00 | 04:20:30~05:16:00 | 06:26:30~07:18:00 |
| | questionnaire | 8:30~9:30 | 10:30~11:15 | 12:00~1:30 | 2:30~3:45 | 4:30~5:30 | 6:30~7:30 |
| DT29 | plant data | 8:15~9:15 | 10:30~11:15 | 12:15~1:15 | 2:15~3:30 | 4:15~5:30 | 6:30~7:15 |
| | observation | 8:34~9:01 | 10:26~11:01 | 12:11~12:55 | 2:14~3:03 | 4:18~5:05 | 6:20~7:04 |
| | Observation (including from waiting room to machine) | none | 10:19~11:01 (+7) | 12:09~12:55 (+2) | 2:05~3:03 (+9) | 4:07~5:05 (+11) | none |
| | real time | None (late in carrying the sensor) | 10:25:00~10:59:30 | 12:13:30~12:56:30 | 02:10:30~03:06:30 | 04:12:30~05:07:30 | 06:17:00~07:09:00 |
| | questionnaire | 8:00~9:00 | 10:00~10:30 | 12:00~1:00 | 2:00~3:00 | 4:00~4:30 | 6:00~6:30 |
| DT13 | plant data | 8:15~9:15 | 10:30~11:15 | 12:15~1:15 | 2:15~3:30 | 4:15~5:30 | 6:30~7:15 |
| | observation | 8:50~9:01 | 10:18~11:06 | 12:16~12:56 | 2:14~3:05 | 4:18~4:56 | 6:19~6:56 |
| | Observation (including from waiting room to machine) | none | 10:14~11:06 (+4) | 12:16~12:56 | 2:10~3:05 (+4) | 4:07~4:56 (+11) | 6:17~6:56 (+2) |
| | real time | 8:20:30~09:01:00 | 10:19:00~11:09:00 | 12:19:00~12:54:00 | 02:14:00~03:02:30 | 04:11:00~05:00:00 | 06:20:00~06:55:30 |
| | questionnaire | 8:30~9:00 | 10:00~11:00 | 12:00~1:00 | 2:00~3:00 | 4:30~5:00 | 6:00~7:00 |
| DT19 | plant data | 8:15~9:15 | 10:30~11:15 | 12:15~1:15 | 2:15~3:30 | 4:15~5:30 | 6:30~7:15 |
| | observation | 8:33~9:46 | 10:34~11:04 | 12:21~1:08 | 2:17~3:02 | 4:17~5:12 | 6:20~7:03 |
| | Observation (including from waiting room to machine) | none | 10:30~11:04 (+4) | 12:16~01:08 (+5) | 2:15~3:02 (+2) | 4:14~5:12 (+3) | 6:14~7:03 (+6) |
| | real time | 8:17:30~09:47:30 | 10:31:30~11:07:00 | 12:20:00~01:11:30 | 02:16:30~03:05:30 | 04:16:00~05:15:30 | 06:17:00~07:05:30 |
| | questionnaire | 8:30~9:00 | 10:30~11:00 | 12:30~1:00 | 2:30~3:00 | 3:30~4:00 | 6:00~6:30 |
| DT6 | plant data | 8:15~9:15 | 10:30~11:15 | 12:15~1:15 | 2:15~3:30 | | |
| | observation | 8:29~9:30 | 10:30~11:12 | 12:11~1:24 | 2:14~3:09 | | |
| | Observation (including from waiting room to machine) | 8:08~9:30 (+21) | 10:29~11:12 (+1) | 12:11~1:24 | 2:11~3:09 (+3) | | |
| | real time | 8:18:30~09:31:00 | 10:31:00~11:15:30 | 12:12:00~01:31:00 | Over scale | | |
| | questionnaire | 8:00~10:00 | 10:00~11:30 | 12:30~2:00 | 2:00~3:30 | | |
| DT24 | plant data | 8:15~9:15 | 10:30~11:15 | 12:15~1:15 | 2:15~3:30 | | |
| | observation | 8:29~9:03 | 10:30~11:02 | 12:11~12:57 | 2:14~3:03 | | |
| | Observation (including from waiting room to machine) | 8:14~9:03 (+15) | 10:30~11:02 | 12:11~12:57 | 2:11~3:03 (+3) | | |
| | real time | 8:16:00~09:07:30 | 10:31:30~11:06:00 | 12:12:30~12:57:00 | 02:13:30~03:04:30 | | |
| | questionnaire | 8:00~9:30 | 10:00~11:30 | 12:30~2:00 | 2:00~3:00 | | |

TABLE 2 workers activity time period by plant data, observation, real time and questionnaires

| device code | time type | first time | 2nd time | 3rd time | fourth time | fifth time | 6th time | total time (min) |
|---|---|---|---|---|---|---|---|---|
| DT8 | plant data | 60 | 45 | 60 | 75 | 75 | 45 | 360 |
| | observation | 49 | 32 | 40 | 49 | 45 | 36 | 251 |
| | Observation (including from waiting room to machine) | none | 35 | 41 | 51 | 47 | 38 | 261 |
| | real time | 50.5 | 36 | 41 | 48.5 | 47.5 | 38 | 261.5 |
| | questionnaire | 60 | 30 | 30 | 30 | 30 | 30 | 210 |
| DT12 | plant data | 60 | 45 | 60 | 75 | 75 | 45 | 360 |
| | observation | 42 | 27 | 42 | 47 | 54 | 46 | 258 |
| | Observation (including from waiting room to machine) | this person stayed at other waiting room and was not observed to have left the waiting room | | | | | | |
| | real time | 51.5 | 29.5 | 47 | 50 | 55.5 | 51.5 | 285 |
| | questionnaire | 60 | 45 | 90 | 75 | 60 | 60 | 390 |
| DT29 | plant data | 60 | 45 | 60 | 75 | 75 | 45 | 360 |
| | observation | 27 | 35 | 44 | 49 | 47 | 44 | 246 |
| | Observation (including from waiting room to machine) | none | 42 | 46 | 58 | 58 | none | 275 |
| | real time | None (late in carrying the sensor) | 34.5 | 43 | 56 | 55 | 52 | **240.5 (less one time) |
| | questionnaire | 60 | 30 | 60 | 60 | 30 | 30 | 270 |
| DT13 | plant data | 60 | 45 | 60 | 75 | 75 | 45 | 360 |
| | observation | 11 | 48 | 40 | 51 | 38 | 37 | 225 |
| | Observation (including from waiting room to machine) | none | 52 | 40 | 55 | 49 | 39 | 246 |
| | real time | 40.5 | 50 | 35 | 48.5 | 49 | 35.5 | 258.5 |
| | questionnaire | 30 | 60 | 60 | 60 | 30 | 60 | 300 |
| DT19 | plant data | 60 | 45 | 60 | 75 | 75 | 45 | 360 |
| | observation | 73 | 30 | 47 | 45 | 55 | 43 | 293 |
| | Observation (including from waiting room to machine) | none | 34 | 52 | 47 | 58 | 49 | 313 |
| | real time | 90 | 35.5 | 51.5 | 49 | 59.5 | 48.5 | 334 |
| | questionnaire | 30 | 30 | 30 | 30 | 30 | 30 | 180 |
| DT6 | plant data | 60 | 45 | 60 | 75 | | | 240 |
| | observation | 61 | 42 | 73 | 55 | | | 231 |
| | Observation (including from waiting room to machine) | 82 | 43 | 73 | 58 | | | 256 |
| | real time | 72.5 | 44.5 | 79 | **Over scale | | | **196 (less one time) |
| | questionnaire | 120 | 90 | 90 | 90 | | | 390 |
| DT24 | plant data | 60 | 45 | 60 | 75 | | | 240 |
| | observation | 34 | 32 | 46 | 49 | | | 161 |
| | Observation (including from waiting room to machine) | 49 | 32 | 46 | 52 | | | 179 |
| | real time | 51.5 | 34.5 | 44.5 | 51 | | | 181.5 |
| | questionnaire | 90 | 90 | 90 | 60 | | | 330 |

**indicate one omission in real time

Explanation of Table 2

Table 2 calculates the total time from beginning till ending of the time types in Table 1, e.g., the plant data of the device DT8 being 60 minutes at the first time (8:15 to 9:15 of Table 1), and the real time value of the first time being 50.5 minutes (8:16:30 to 9:07:00 of Table 1).

Table 3 is similar to Table 1. However, different workers carried different codes (see Table 3).

Table 4 is similar to Table 2 and is obtained from the calculation of the values of Table 3.

TABLE 3 workers activity time by plant data, observation, real time, and questionnaires

| device code | time type | first time | 2nd time | 3rd time | fourth time | fifth time | 6th time |
|---|---|---|---|---|---|---|---|
| DT14 | plant data | 8:30~9:30 | 10:30~11:15 | 12:30~1:15 | 2:30~3:30 | 4:30~5:30 | 6:30~7:30 |
| | observation | 8:27~9:09 | 10:29~11:02 | 12:27~12:58 | 2:24~2:59 | 4:23~5:15 | 6:27~7:09 |
| | Observation (including from waiting room to machine) | 8:20~9:09 (+7) | 10:24~11:02 (+5) | 12:23~12:58 (+4) | 2:22~2:59 (+2) | 4:17~5:15 (+6) | 6:16~7:09 (+11) |
| | real time questionnaire | 8:21:30~09:13:30 | 10:26:00~11:03:00 | 12:26:30~01:59:30 | 02:24:30~02:59:30 | 04:22:30~05:16:30 | 06:21:00~07:10:30 |
| DT31 | plant data | 8:30~9:30 | 10:30~11:15 | 12:30~1:15 | 2:30~3:30 | 4:30~5:30 | 6:30~7:30 |
| | observation | 8:27~9:06 | 10:31~11:03 | 12:27~12:58 | 2:24~3:00 | 4:23~5:11 | 6:28~7:06 |
| | Observation (including from waiting room to machine) | 8:15~9:06 (+12) | 10:25~11:03 (+6) | 12:22~12:58 (+5) | 2:21~3:00 (+3) | 4:17~5:11 (+6) | 6:24~7:06 (+4) |
| | real time questionnaire | 8:15:30~09:08:00 | 10:27:00~11:06:30 | 12:23:00~03:01:00 | 02:24:00~03:01:00 | 04:19:00~05:13:00 | 06:26:00~07:08:30 |
| DT20 | plant data | 8:30~9:30 | 10:30~11:15 | 12:30~1:15 | 2:30~3:30 | 4:30~5:30 | 6:30~7:30 |
| | observation | 8:26~9:02 | 10:22~10:58 | 12:18~12:54 | 2:21~2:57 | 4:18~4:58 | 6:25~7:00 |
| | Observation (including from waiting room to machine) | 8:06~9:02 (+20) | 10:17~10:58 (+5) | 12:14~12:54 (+4) | 2:13~5:57 (+8) | 4:14~4:58 (+4) | 6:22~7:00 (+3) |
| | real time questionnaire | 08:19:30~09:01:30 | 10:19:00~10:59:30 | 12:22:00~01:55:30 | 02:21:30~02:59:00 | 04:16:00~05:06:30 | 06:24:00~07:05:30 |
| DT33 | plant data | 8:30~9:30 | 10:30~11:15 | 12:30~1:15 | 2:30~3:30 | 4:30~5:30 | 6:30~7:30 |
| | observation | 8:26~8:59 | 10:21~10:58 | 12:19~12:53 | 2:19~2:57 | 4:20~5:04 | 6:22~7:04 |
| | Observation (including from waiting room to machine) | | this person stayed at other waiting room and was not observed to have left the waiting room | | | | |
| | real time questionnaire | 08:17:30~09:04:00 | 10:18:30~11:00:30 | 12:12:30~12:56:30 | 02:15:30~03:00:00 | 04:19:00~05:06:30 | 06:13:30~07:06:30 |
| DT28 | plant data | 8:30~9:30 | 10:30~11:15 | 12:30~1:15 | 2:30~3:30 | | |
| | observation | 8:47~9:11 | 10:21~11:32 | 12:25~12:59 | 2:25~3:14 | | |
| | Observation (including from waiting room to machine) | none | 10:21~11:32 | 12:22~12:59 (+3) | 2:21~3:14 (+4) | | |
| | real time questionnaire | 08:48:00~09:16:30 | 10:24:30~11:36:30 | 12:24:00~01:01:30 | 02:23:00~03:21:00 | | |
| DT25 | plant data | 8:30~9:30 | 10:30~11:15 | 12:30~1:15 | 2:30~3:30 | | |
| | observation | 8:26~9:10 | 10:24~11:14 | 12:24~1:21 | 2:22~3:00 | | |
| | Observation (including from waiting room to machine) | 8:17~9:10 (+9) | 10:24~11:14 | 12:22~1:21 (+2) | 2:22~3:00 | | |
| | real time questionnaire | 08:19:30~09:18:30 | 10:25:00~11:16:00 | 12:24:00~01:22:30 | 02:23:30~03:01:30 | | |
| DT7 | plant data | 8:30~9:30 | 10:30~11:15 | 12:30~1:15 | 2:30~3:30 | | |
| | observation | 8:26~9:04 | 10:32~11:00 | 12:24~12:53 | 2:22~2:58 | | |

TABLE 3-continued workers activity time by plant data, observation, real time, and questionnaires

| device code | time type | first time | 2nd time | 3rd time | fourth time | fifth time | 6th time |
|---|---|---|---|---|---|---|---|
| | Observation (including from waiting room to machine) | 8:18~9:04 (+8) | 10:24~11:00 (+8) | 12:23~12:53 (+1) | 2:22~2:58 | | |
| | real time questionnaire | 08:20:00~09:06:30 | 10:27:30~11:00:00 | 12:24:30~12:57:00 | 02:24:00~03:03:00 | | |

TABLE 4 workers activity time period by plant data, observation, real time and questionnaires

| device code | time type | first time | 2nd time | 3rd time | fourth time | fifth time | 6th time | total time (min) |
|---|---|---|---|---|---|---|---|---|
| DT14 | plant data | 60 | 45 | 45 | 60 | 60 | 60 | 330 |
| | observation | 42 | 33 | 31 | 35 | 52 | 42 | 235 |
| | Observation (including from waiting room to machine) | 49 | 38 | 35 | 37 | 58 | 53 | 270 |
| | real time questionnaire | 52 | 37 | 33 | 35 | 54 | 49.5 | 260.5 |
| DT31 | plant data | 60 | 45 | 45 | 60 | 60 | 60 | 330 |
| | observation | 39 | 32 | 31 | 36 | 48 | 38 | 224 |
| | Observation (including from waiting room to machine) | 51 | 38 | 36 | 39 | 54 | 42 | 260 |
| | real time questionnaire | 52.5 | 39.5 | 38 | 37 | 54 | 42.5 | 263.5 |
| DT20 | plant data | 60 | 45 | 45 | 60 | 60 | 60 | 330 |
| | observation | 36 | 36 | 36 | 36 | 40 | 35 | 219 |
| | Observation (including from waiting room to machine) | 56 | 41 | 40 | 44 | 44 | 38 | 263 |
| | real time questionnaire | 42 | 40.5 | 33.5 | 37.5 | 50.5 | 41.5 | 245.5 |
| DT33 | plant data | 60 | 45 | 45 | 60 | 60 | 60 | 330 |
| | observation | 33 | 37 | 34 | 38 | 44 | 42 | 228 |
| | Observation (including from waiting room to machine) | | this person stayed at other waiting room and was not observed to have left the waiting room | | | | | |
| | real time questionnaire | 46.5 | 42 | 44 | 44.5 | 47.5 | 53 | 277.5 |
| DT28 | plant data | 60 | 45 | 45 | 60 | | | 210 |
| | observation | 24 | 71 | 34 | 49 | | | 178 |
| | Observation (including from waiting room to machine) | 24 none | 71 | 37 | 53 | | | 185 |
| | real time questionnaire | 28.5 | 72 | 37.5 | 58 | | | 196 |

TABLE 4-continued workers activity time period by plant data, observation, real time and questionnaires

| device code | time type | first time | 2nd time | 3rd time | fourth time | fifth time | 6th time | total time (min) |
|---|---|---|---|---|---|---|---|---|
| DT25 | plant data | 60 | 45 | 45 | 60 | | | 210 |
| | observation | 44 | 50 | 57 | 38 | | | 189 |
| | Observation (including from waiting room to machine) | 53 | 50 | 59 | 38 | | | 200 |
| | real time questionnaire | 59 | 51 | 58.5 | 38 | | | 206.5 |
| DT7 | plant data | 60 | 45 | 45 | 60 | | | 210 |
| | observation | 38 | 28 | 29 | 36 | | | 131 |
| | observation (including from waiting room to machine) | 46 | 36 | 30 | 36 | | | 148 |
| | real time questionnaire | 46.5 | 32.5 | 32.5 | 39 | | | 150.5 |

In Tables 1 to 4 "none" indicates that the time of departure of the worker to the work site was not recorded.

Statistics of the values of Tables 2 and 4 are run. The results are shown in Table 5. The letter "n" denotes the work time blocks. For examples:

n=108=27×4
n=135=27×5 wherein 27: number of workers

4: each work shift (8 hrs), with four high and intermediate exposure times.

5: each work shift (8 hrs), with five low exposure times.

TABLE 5

The correlation of the reference standard data and the TAP data obtained by three kinds of techniques based on the separate work time block of 27 exposed workers*

| | Linear regression | $R^2$ | n |
|---|---|---|---|
| $T_{H, ETAR}$ vs $T_{H, observed}$ | Y = 0.8921xX + 5.1935 | 0.8343 | 108 |
| $T_{M, ETAR}$ vs $T_{M, observed}$ | Y = 0.8336xX + 0.4896 | 0.6017 | 108 |
| $T_{L, ETAR}$ vs $T_{L, observed}$ | Y = 0.9116xX + 7.1155 | 0.8143 | 135 |
| $T_{H+M, ETAR}$ vs $T_{H+M, observed}$ | Y = 0.9243xX + 3.5295 | 0.8316 | 108 |
| $T_{H+M, questionnaires}$ vs $T_{H+M, observed}$ | Y = −0.0046xX + 46.373 | 0.0001 | 108 |
| $T_{L, questionnaires}$ vs $T_{L, observed}$ | Y = −0.1189xX + 82.817 | 0.109 | 135 |
| $T_{H+M\ plant\ schedule}$ vs $T_{H+M, observed}$ | Y = −0.4726xX + 19.153 | 0.1799 | 108 |
| $T_{L, plant\ schedule}$ vs $T_{L, observed}$ | Y = −0.2563xX + 58.239 | 0.0606 | 135 |

*"questionnaire", "observed", "plant schedule", and "ETAR" denotes respectively the questionnair after work, the direct observation, plant work schedule (Table 1) and the worker exposure time data obtained by ETAR.

$T_H$: denotes the exposure time at which the worker opened the gas hood of spinning machine to remove the rayon coils.

$T_M$: denotes the exposure time at which the worker closed the gas hood and inspected various spinning machines.

$T_L$: denotes the time during which the worker stayed in the waiting room.

$T_{H+M}$: denotes the sum of $T_H$ and $T_M$. In each 8-hr work shift, the workers had four times of high and intermediate exposure time blocks ($T_H$ and $T_M$), and five low exposure time blocks ($T_L$).

Table 6: similar to Table 5, with 27 workers being the n value for calculation.

TABLE 6

Correlation of reference standard data and TAP data obtained by three kinds of techniques based on 8-hr work time block of 27 exposed workers

| | Linear regression | $R^2$ | n |
|---|---|---|---|
| $T_{H, ETAR}$ vs $T_{H, observed}$ | Y = 0.9673xX + 9.6409 | 0.9463 | 27 |
| $T_{M, ETAR}$ vs $T_{M, observed}$ | Y = 0.8266xX + 2.9269 | 0.6811 | 27 |
| $T_{L, ETAR}$ vs $T_{L, observed}$ | Y = 1.0207Xx − 5.2579 | 0.9803 | 27 |
| $T_{H+M, ETAR}$ vs $T_{H+M, observed}$ | Y = 0.9701xX − 7.9186 | 0.9341 | 27 |
| $T_{H+M, questionnaires}$ vs $T_{H+M, observed}$ | Y = 0.1421xX + 176.04 | 0.0671 | 27 |
| $T_{L, questionnaires}$ vs $T_{L, observed}$ | Y = 0.5945xX + 115.93 | 0.4132 | 27 |
| $T_{H+M, plant\ schedule}$ vs $T_{H+M, observed}$ | Y = 0.7321xX + 21.811 | 0.7229 | 27 |
| $T_{L, plant\ schedule}$ vs $T_{L, observed}$ | Y = 1.3946xX − 57.804 | 0.9209 | 27 |

Comparison of TAP Data Obtained by New Method and Traditional Methods

The proportion (%) (mean±SD, min) of exposure time throughout the 8-hr work shift of $T_H$, $T_M$ and $T_L$ of 27 exposed workers were respectively 40.36% (186.74±55.15 min), 5.31% (24.56±18.91 min) and 54.33% (251.33±90.15 min). In the meantime, it was difficult to distinguish $T_M$ and $T_H$ in this workplace by means of questionnaires or plant work schedules. No statistically significant difference was found between the TAP data obtained by the direct observation and by ETAR. The linear regression showed close correlation for both time blocks ($R^2$=0.83, slope=0.92, n=108) and 8-hr work shift ($R^2$=0.93, slope=0.97, n=27), as shown in Tables 5 and 6. On the contrary, the correlation was poor ($R^2$<0.2) between the TAP data obtained either by the questionnaires of the exposed workers after work or the plant work schedule and the direct observation. When the comparison was done on the 8-hr work shift basis, the correlation of three techniques was improved, as shown in Table 6. For the plant work schedule, the improvement is apparently improved further ($R^2$=0.723 for $T_{H+M}$, and 0.921 for $T_L$), but the corresponding slopes were under estimated by 27% and over estimated by 40% from that of the direct observation.

DISCUSSION

The results confirm that the new ETAR is better than the traditional questionnaires in terms of providing the accurate exposure activity and time data. Even in the circumstance that the work activity is considerably regular, the accuracy of the traditional questionnaire data is very poor. As a result, the reliability of the traditional questionnaire is even much poorer in light of complexity and versatility of a workplace.

The experimental results show that ETAR is capable of providing accurate data even in the circumstance in which a great deal of difference exists among different work time exposures. If necessary, the same or similar exposure operations may be grouped together to reduce the exposure classification, thereby simplifying the exposure assessment. For example, the laboratory tests show the hydrogen sulfide released from the rayon coils can interfere the measuring of carbon disulfide by the tin oxide sensor. In view of the fact that both carbon disulfide and hydrogen sulfide are released from the hood of spinning machine simultaneously, the response of carbon disulfide and interference of hydrogen sulfide was in the same direction. As a result, ETAR can still provide accurate TAP information.

The tin oxide sensor was replaced by an alcohol sensor for conducting the alcohol test. The result shows that an excellent correlation between ETAR and direct observation data of reference standard for the short time time blocks ($R^2$= 0.9937, slope=0.9996, n=104) and for 8-hr work shift ($R^2$= 0.9993, slope=0.9995, n=30). In the lab, test, the exposed students were careful to record their own TAP data. In the on-site survey, the activity of workers tends to be more complicated and capricious. The researchers were apt to recognize erroneously the workers who wore masks. Due to the labor shortage, the TAP data were likely recorded with error, especially the short-time activity, $T_M$. For this reason, the accuracy of the reference standard becomes questionable.

The production processes, facilities, raw materials, production rates and engineering controls for most enterprises are generally not subject to frequent change. In light of this fact, the variation in workers' exposure is mainly due to the time activity patterns ($TAP_s$). The monitoring of personal TAP is much cheaper and easier than that of sampling and analysis of personal monitoring. For this reason, the method of the present invention can easily increase the sample size and improve the representative of exposure assessment at low cost. Aside from the low cost and the convenience, the method of the present invention can provide the valuable information of time-concentration profile during a work shift.

In compared with the traditional methods, the method of the present invention can provide a cheaper, fully-automatic, easy-operation, accurate, and quick response (time to reach 90% of the equilibrium time was less than 30 seconds). The apparatus used in the present invention is small in volume and light in weight and is capable of real time and accurate measurement of workers' exposure TAP data.

REFERENCE MATERIALS

1. Jenkins, P. L.; Phillips, T. J.; Mulberg, E. J.; Hui, S. P. Atmos. Environ. 1992, 26A, 2141–2148.
2. Leaderer, B. P.; Lioy, P. J.; Spengler, J. D. Environ. Health Persp Suppl. 1993, 101, 167–177.
3. Schwab M.; Terblanche A. P. S.; Spengler J. D. J. Expo. Ana. Env. Epid. 1991, 1, 339–356.
4. Teschke, K.; Marion, S. A.; Jin, A.; Fenske, R. A.; Netten C. Am. Ind. Hyg. Assoc. J. 1994, 55, 443–449.
5. Moschandreas, D. J.; Relwani S. J. Expo. Ana. Env. Epid. 1991, 1, 357–367.
6. Waldman, J. M.; Bilder, S. M.; Freeman, N. C. G.; Friedman, M. J. Expo. Ana. Env. Epid. 1993, 3, 39–48.

What is claimed is:

1. A method for monitoring a worker's exposure time, said method comprising the steps of:

making the worker carry a sensing device to monitor continually in a real-time manner a hazardous material existing in a workplace of the worker;

transmitting results of the monitoring from the sensor to a recorder incorporated together with the sensor, the sensor and recorder forming a monitor-recorder device;

recording the results of the monitoring in the recorder in real time manner;

simultaneously recording a monitoring time obtained from a timer built-in to the monitor-recorder device, so that a real-time continuous exposure level of said hazardous material is obtained.

2. The method as defined in claim 1, wherein said sensing device comprises a chemical sensor.

* * * * *